(12) United States Patent
Cierniak

(10) Patent No.: US 6,915,392 B2
(45) Date of Patent: Jul. 5, 2005

(54) OPTIMIZING MEMORY USAGE BY VTABLE CLONING

(75) Inventor: Michal J Cierniak, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 220 days.

(21) Appl. No.: 10/193,156

(22) Filed: Jul. 12, 2002

(65) Prior Publication Data

US 2004/0010664 A1 Jan. 15, 2004

(51) Int. Cl.$^7$ ............................................. G06F 12/00
(52) U.S. Cl. .................. 711/152; 711/147; 711/154; 711/156; 707/8; 710/200
(58) Field of Search ................. 711/147, 152, 711/163, 167, 161, 154, 156, 162; 707/8, 204; 710/200

(56) References Cited

U.S. PATENT DOCUMENTS

| | | | | |
|---|---|---|---|---|
| 5,701,470 A | * | 12/1997 | Joy et al. ................ | 707/103 R |
| 5,761,670 A | * | 6/1998 | Joy ......................... | 707/103 R |
| 6,182,186 B1 | * | 1/2001 | Daynes ..................... | 710/200 |
| 6,463,480 B2 | * | 10/2002 | Kikuchi et al. ............. | 719/315 |
| 2001/0032281 A1 | * | 10/2001 | Daynes ..................... | 710/200 |
| 2002/0161954 A1 | * | 10/2002 | Joy et al. ................... | 710/200 |
| 2003/0093577 A1 | * | 5/2003 | Bak et al. ................... | 709/315 |
| 2003/0097360 A1 | * | 5/2003 | McGuire et al. ............ | 707/8 |

* cited by examiner

Primary Examiner—Mano Padmanabhan
Assistant Examiner—Jasmine Song
(74) Attorney, Agent, or Firm—Pillsbury Winthrop LLP

(57) ABSTRACT

An arrangement is provided for optimizing memory usage through vtable cloning. When a request to acquire a shared object is received, it is first examined to see whether the shared object is currently locked via a vtable pointer stored in the shared object. If the shared object is not locked, a cloned vtable is constructed based on a shared vtable and the cloned vtable is used to lock the shared object.

30 Claims, 9 Drawing Sheets

US 6,915,392 B2

OPTIMIZING MEMORY USAGE BY VTABLE CLONING

BACKGROUND

Processes in an application being executed may share resources. Such resources may include objects. For example, different threads in a multithreaded program may share information stored in some critical sections. Accessing shared resources may be mutually exclusive. That is, at a single time, an object can be accessed by only one process. To ensure exclusivity, use of shared objects may be synchronized. Some programming systems provide synchronization libraries. Other programming systems such as Java and C++ offer synchronization capabilities that are built into the programming languages themselves.

In a programming system that has synchronization capabilities built into the language itself, every object may have two fields. One field is a vtable pointer pointing to a shared vtable that stores common information among different objects of a same class. The other field is called lock information that describes the lock status of the underlying object.

FIG. 1 illustrates the construct of objects and their relationship with the shared vtable. There are k objects (e.g., object 1 110, object 2 120, ..., object k 130) of a same class. Each of the objects has a pointer to a shared vtable 140 (e.g., pointer to vtable 110a of the object 1 110, pointer to vtable 120a of the object 2 120, ..., and pointer to vtable 130a of the object k 130) that stores information common to all k objects in the same class. Each object also has a lock information field (e.g., lock information 110b of the object 1 110, lock information 120b of the object 120, ..., and lock information 130b of the object k 130) that records the lock status of the underlying object.

An object is either locked or not locked. When most objects of a same class are not locked, which is often the case, the lock information within such non-locking objects is identical. Having a separate field in each object to represent the same information wastes memory space and sacrifices efficiency.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar parts throughout the several views of the drawings, and wherein:

DETAILED DESCRIPTION

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software or firmware being run by a general-purpose or network processor. Data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
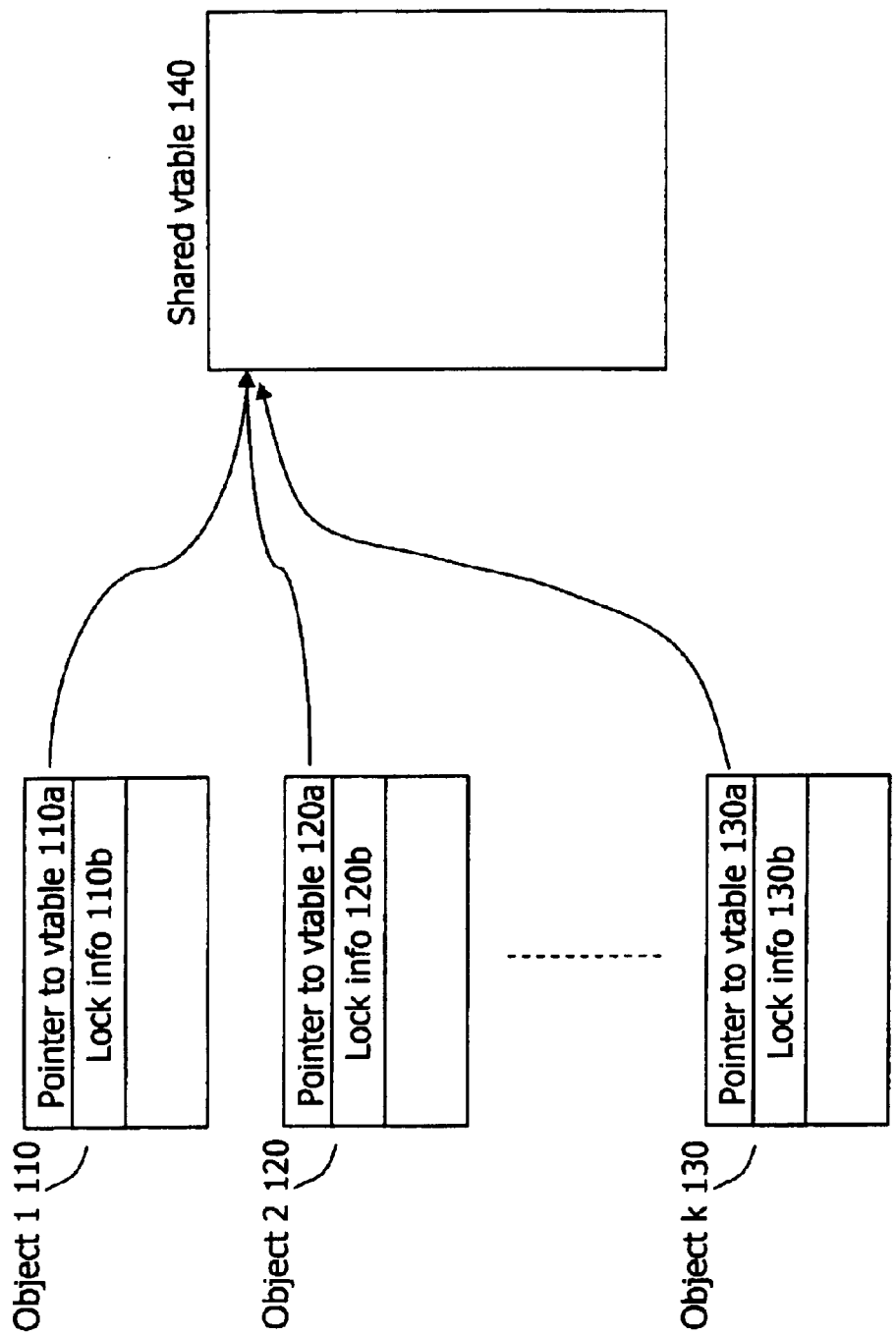
FIG. 1 (Prior Art) describes a framework in which each of a plurality of objects has its own lock information stored separately in the object.
Figure 2:
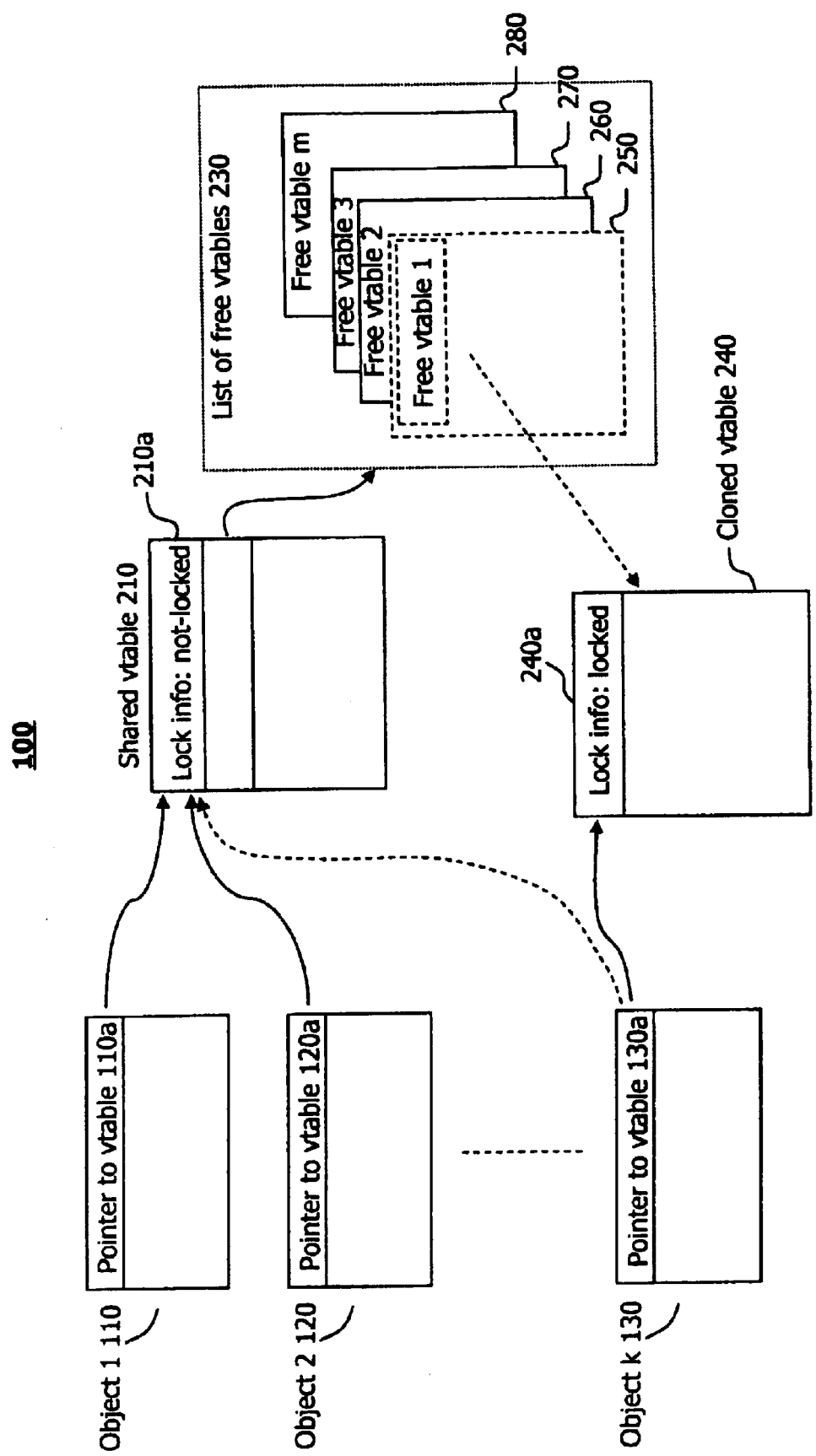
FIG. 2 depicts a framework in which an object can be locked via a cloned vtable and non-locking objects share lock information via a shared vtable, according to embodiments of the present invention.

FIG. 2 depicts a framework 100 in which an object can be locked via a cloned vtable and non-locking objects share lock information via a shared vtable, according to embodiments of the present invention. There are a plurality of objects (object 1 110, object 2 120, ..., object k 130) that may correspond to different instantiated objects of a same class. Each of the objects has a pointer to a vtable. For example, the object 1 110 has a pointer 110a pointing to a shared vtable 210, the object 2 120 has a pointer 120a pointing to the same shared vtable 210, and the object k 130 has a pointer 130a pointing to a cloned vtable 240. All objects pointing to the shared vtable are not locked so that they share the lock information stored in the shared vtable indicating the common non-locking status of the objects. An object that is locked points to a separate cloned vtable that is identical to the shared vtable except the lock information that is set to indicate that the associated object is currently locked.

Objects of a same class may initially all point to the shared vtable 210 where information shared among these objects is stored. When a process requests to acquire (or uses) an object, the object may need to be locked to ensure exclusive use. Such a process can be an application, a program, or a thread in a multithreaded program. In the framework 100, a cloned vtable 240 is used to lock an object. For example, initially, the object k 130 may have a pointer pointing to the shared vtable 210 (the dotted curve from the object k 130 to the shared vtable 210). When the object k 130 is to be acquired, to lock the object k 130, the cloned vtable 240 is created which includes specific lock information indicating that the object k 130 is now locked.

The cloned vtable 240 may be cloned from the shared vtable 210. The cloned vtable 240 may contain the identical information as the shared vtable 210 when it is created. That is, the content within the cloned vtable 240 may be initially copied from the shared vtable 210. The cloned vtable 240 may then be modified to reflect the locking status of the object k 130. For example, the original lock information in the shared vtable 210 may be set as "not locked", indicating that all objects that share information using the shared vtable are not locked. Such lock information, once copied into the cloned vtable 240, may then be modified to "locked" to indicate that the object k 130 is now locked.

To use the cloned vtable 240 to lock the object k 130, the pointer 130a in the object k 130 may be changed from pointing (initially) to the shared vtable 210 to pointing to the cloned vtable 240. This may be carried out by simply replacing the original pointer using the pointer with the address of the cloned vtable 240.

There may be different ways to create a cloned vtable for locking purposes. For example, memory space may be dynamically allocated when a cloned vtable is needed. When a cloned vtable is released (e.g., when the associated object is unlocked), the cloned vtable may be de-allocated.

An alternative approach, as illustrated in FIG. 2, is to keep a list of free vtables that can be used as a cloned vtable whenever it is needed. A list of free vtables 230 is associated with the shared vtable 210. Whenever a cloned vtable is needed, a free vtable, if it is available, may be released from the list of free vtables 230 and used to construct a cloned vtable. For example, when the object k 130 needs to be locked (so that a cloned vtable is required to lock the object k 130), one of the available free vtables (e.g., a free vtable 1 250 corresponding to the dotted box in FIG. 2) in the list of free vtables 230 is released and then used to construct the cloned vtable 240.

When a locked object is unlocked, the corresponding cloned vtable may be accordingly released and inserted back to the list of free vtables 230 as a free vtable for future use. The number of free vtables maintained in the list of free vtables 230 may be determined according to application needs. For example, one alternative for some applications may be to specify a fixed number of free vtables for the list of free vtables 230. With a different alternative, an adaptive number of free vtables, determined at run time, may be retained. In this case, for example, any object that needs a cloned table for locking purposes initially may have to allocate a new vtable. When such vtables are released, they may be gathered as free vtables to form the list of free vtables 230. At a certain point, the demand and the supply of cloned vtables may reach a point where no new vtable needs to be allocated. That is, the number of free vtables in the list 230 can meet the demand for cloned vtables. In this case, the size of the list 230 is determined adaptively according to the dynamic needs of an underlying application.

Figure 3A:
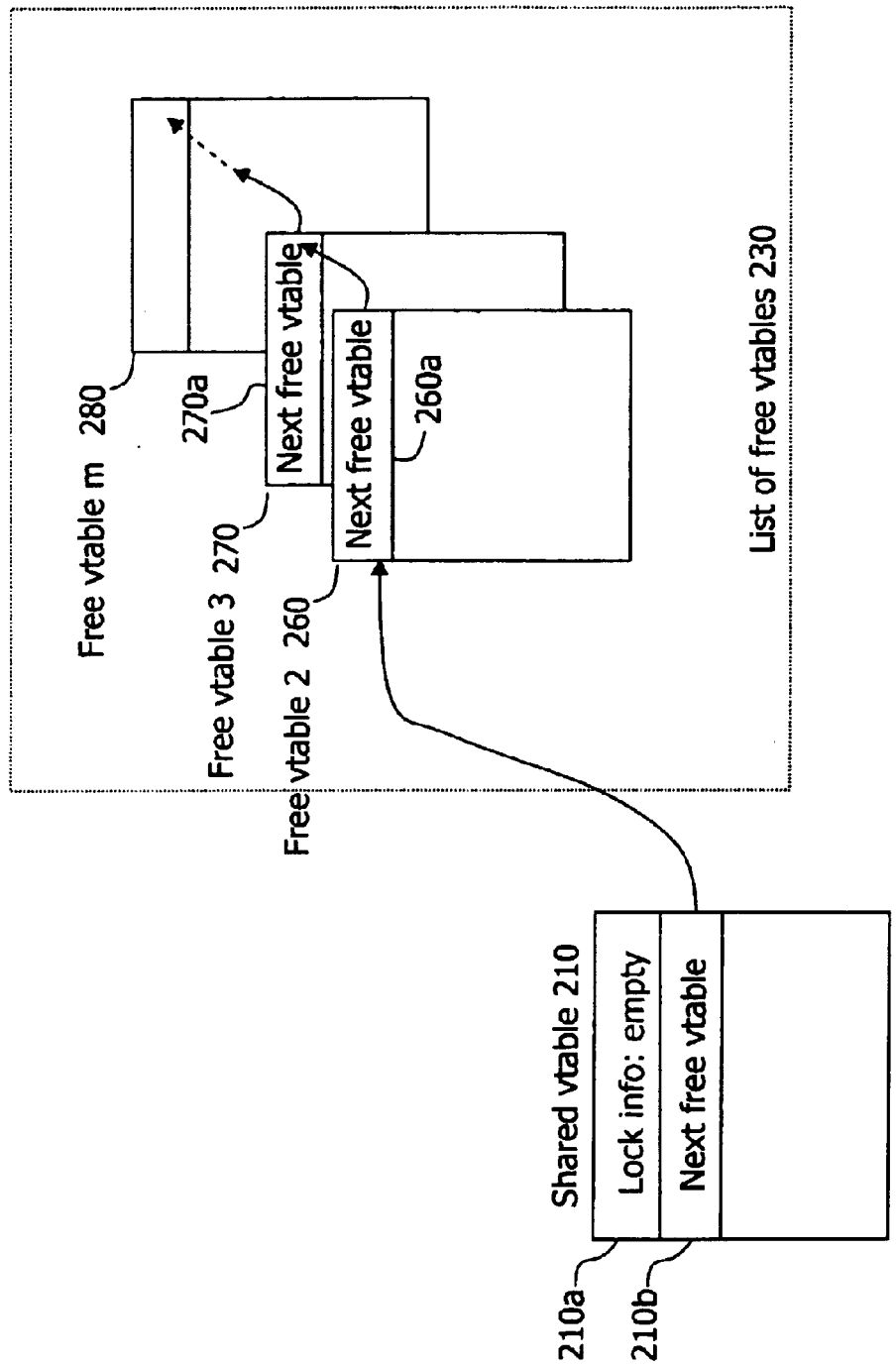
FIG. 3(a) describes an exemplary mechanism of accessing a list of free vtables through a shared vtable, according to embodiments of the present invention.

With a list of free vtables retained, the free vtables in the list may be made accessible through different means. FIG. 3(a) describes an exemplary linked list mechanism to access free vtables through the shared vtable 210, according to embodiments of the present invention. The free vtables (e.g., free vtable 2 260, free vtable 3 270, . . . , free vtable m 280) in the list 230 may form a linked list in which a free vtable (e.g., the free vtable 2 260) may have a pointer called next free vtable pointer (e.g., next free vtable pointer 260a) that points to the next linked free vtable (e.g., free vtable 3 270). The first available free vtable (e.g., the free vtable 2 260) may be accessible via a next free vtable pointer in the shared vtable (e.g., 210b).

Whenever a free vtable is needed to construct a cloned vtable, the first available free vtable in the list 230 may be released from the linked list. For example, in FIG. 2, the cloned vtable 240 may be from free vtable 1 250 that is released from the list of free vtable 230. In this case, the next free vtable may become the first available free vtable and the next free vtable pointer 210b in the shared vtable 210 may be updated to point to the free vtable 2 260 (as shown in FIG. 2). Each of the free vtables in the list 230 may have a backtrack pointer (not shown) that points to the shared vtable 210. Such a backtrack pointer may be used when a cloned vtable is to be inserted back to a list of free vtables.

When a cloned vtable is released, it may be inserted back to a corresponding list of free vtables. A backtrack pointer stored in the released cloned vtable (not shown in FIG. 2) may be used to determine the list to which the released cloned vtable should be inserted. The insertion may be performed at either end of the list, depending on specific implementation of the list. For instance, a list may be realized as a queue with an access priority of first in and first out (FIFO). In this case, a free vtable is removed from the head of the list and a released cloned vtable may be inserted (added) to the list at the end of the list.

A list may also be realized as a stack with an access priority of last in first out (LIFO). In this case, both removal and adding is performed at the top of the stack. That is, a free vtable is removed from the top of the stack. A released cloned vtable is also inserted (added) back to the list at the top of the list. It is also possible that in both implementations, a released cloned vtable may be inserted to either end of the underlying list, depending on whether an application is designed to return a released cloned vtable to immediate use or according to their arrival priority.

Figure 3B:
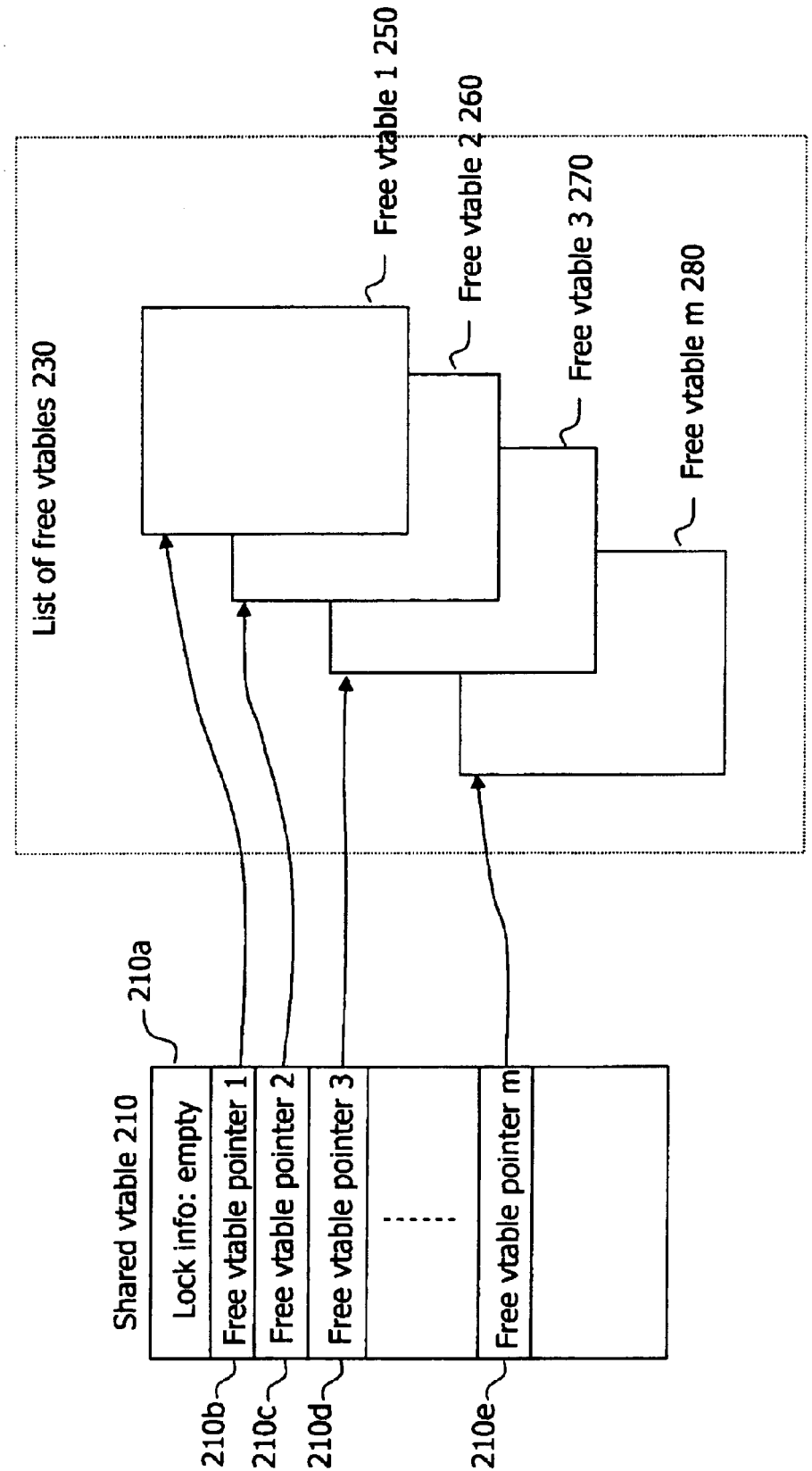
FIG. 3(b) describes a different mechanism of accessing a list of free vtables through a shared vtable, according to embodiments of the present invention.

FIG. 3(b) describes a different exemplary mechanism to access a list of free vtables through the shared vtable 210, according to embodiments of the present invention. In this embodiment, each of the free vtables is accessible directly from the shared vtable 210. That is, the shared vtable 210 provides individual pointers to all the free vtables in the list 230. In this case, a free vtable may be accessed directly from the shared vtable 210 without having to go through a list of pointers. Similarly, in this embodiment, when a released cloned vtable is returned as a free vtable, the pointer corresponding to the returned free vtable may be inserted directly into the shared vtable 210 without having to traverse through a list of free vtables.

The shared vtable 210 may be created with respect to objects of a same class. Each class of objects may have its own shared vtable with shared information particular to that class of objects stored in the corresponding shared vtable. Accordingly, such individual shared vtables may have their own lists of free vtables, used for the purposes of creating cloned vtables whenever the objects of the underlying class require so.

Figure 4:
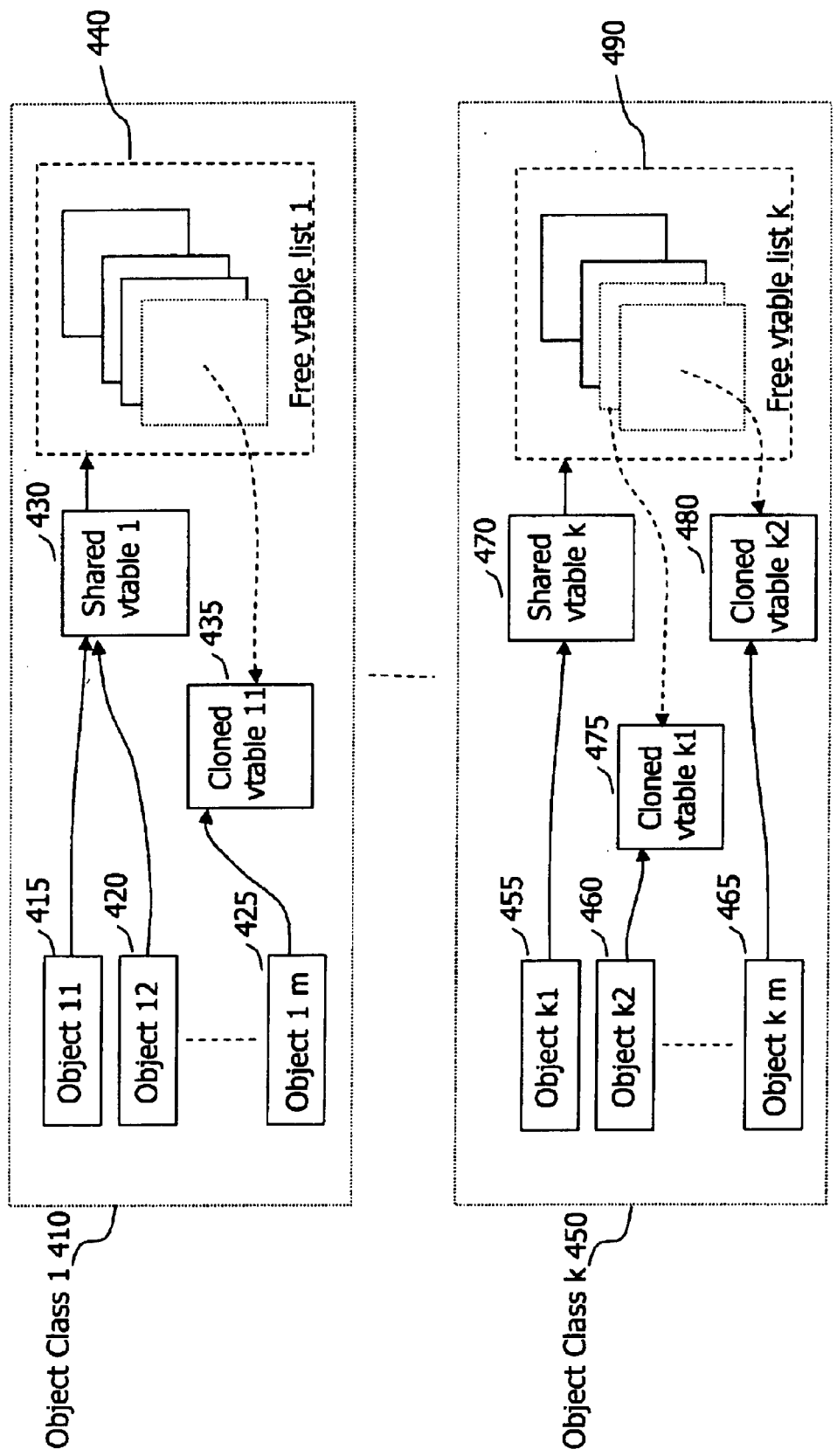
FIG. 4 illustrates an exemplary application of cloned vtables to different object classes, according to embodiments of the present invention.

FIG. 4 illustrates an exemplary application of cloned vtables to different object classes, according to embodiments of the present invention. There are a plurality of classes of object: object class 1 410, . . . , and object class k 450. The object class 1 410 may have multiple objects: object 11 415, object 12 420, . . . , and object 1m 425. These objects have an associated shared vtable 1 430 that may retain a free vtable list 1 440 with a plurality of free vtables for cloning purposes. In the illustrated example shown in FIG. 4, object 1m 425 is locked using a cloned vtable 11 435. The cloned vtable 435 is originally a free vtable in the free vtable list 1 440 and is released, when needed, to construct the cloned vtable 435.

The object class k 450 may also have multiple objects object k1 455, object k2 460, . . . , and object km 465. The objects in the class k 450 share a common vtable k 470 that may be associated with a free vtable list k 490. Whenever an object is to be locked, a free vtable in the free vtable list k 490 is released and used to construct a cloned vtable for locking purposes. For instance, the object k2 460 is locked via a cloned vtable k1 475 and the object km 465 is locked via a cloned vtable k2 480. These two cloned vtables (475 and 480) are originally corresponding to two free vtables in the free vtable list k 490. When the object k2 460 and the object km 465 are requested to be locked for exclusive access, the two corresponding free vtables are released from the list 490 and used to construct the cloned vtables 475 and 480.

Figure 5:
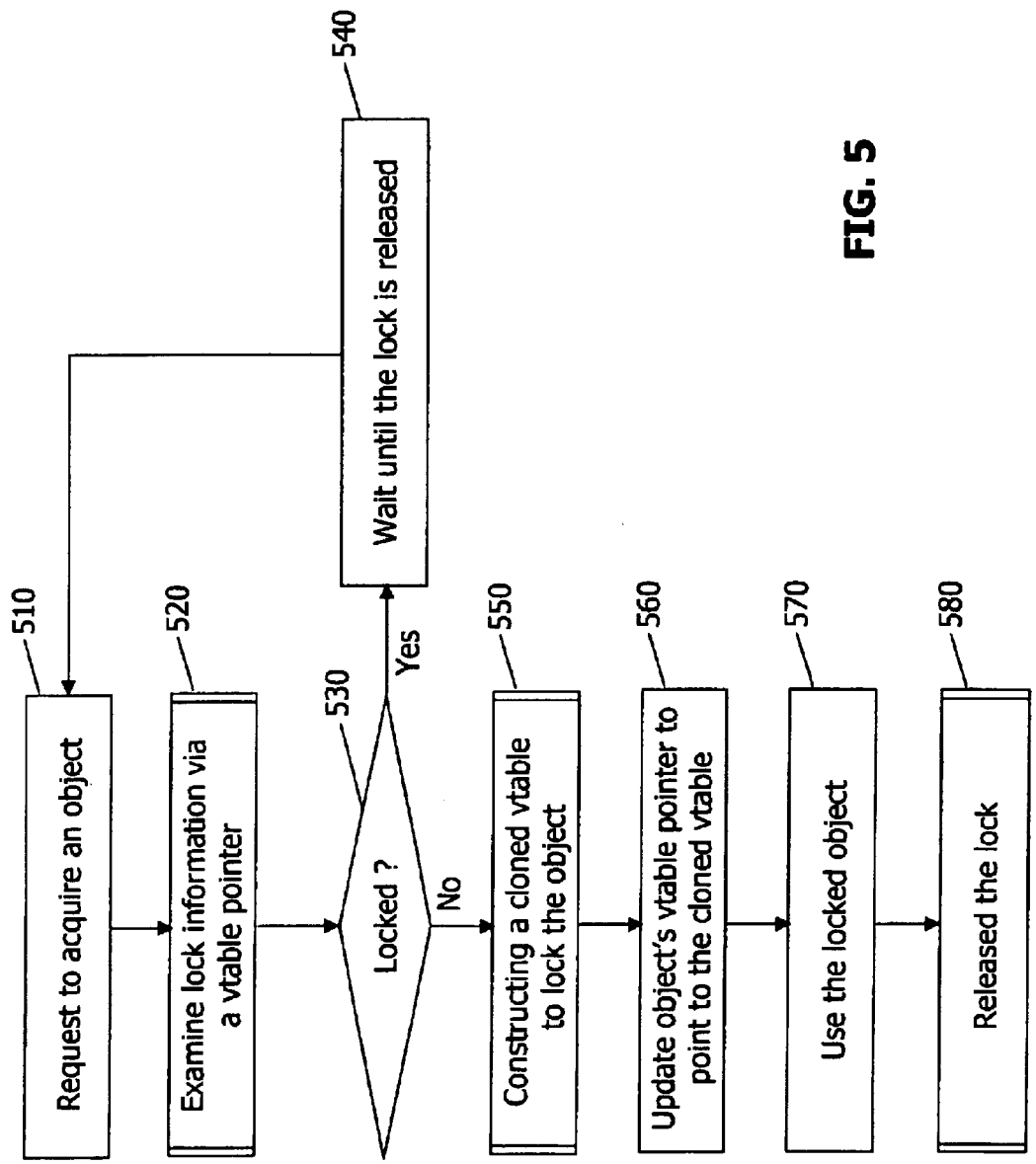
FIG. 5 is a flowchart of an exemplary process, in which an object can be locked via a cloned vtable and non-locking objects share lock information via a shared vtable, according to embodiments of the present invention.

FIG. 5 is a flowchart of an exemplary process, in which an object can be locked via a cloned vtable and non-locking objects share lock information via a shared vtable, according to embodiments of the present invention. A request to acquire an object is first sent at act 510. To determine whether the object is locked, the lock information stored in a vtable is examined at act 520 (details are discussed with reference to FIG. 6). The vtable is accessed through the vtable pointer stored in the object itself. If the object is currently locked, determined at act 530, the process that requests to access the object may wait, at act 540, to acquire the object until the lock is released.

If the object is not yet locked (i.e., no one is accessing the object), determined at act 530, the vtable pointer in the object points to a shared vtable that is shared between the object and all other objects of the same class. That is, the lock information in the shared vtable indicates that there is no lock yet (the shared lock information is for all the non-locking objects in the class). In this case, the process that requests to access the object may proceed to acquire the object and lock the object to ensure exclusive access.

To lock the object, a cloned vtable is constructed, at act 550 to indicate that the object is now locked (details of constructing the cloned vtable are discussed with reference to FIG. 7). To link the object to the newly cloned vtable, the vtable pointer of the object is updated, at act 560, from a pointer pointing at the shared vtable to a pointer pointing at the cloned vtable. After the object is locked, the object is used, at act 570. After the use of the object, the lock represented by the cloned vtable associated with the object is released at act 580 (details about releasing a lock are discussed with reference to FIG. 8).

Figure 6:
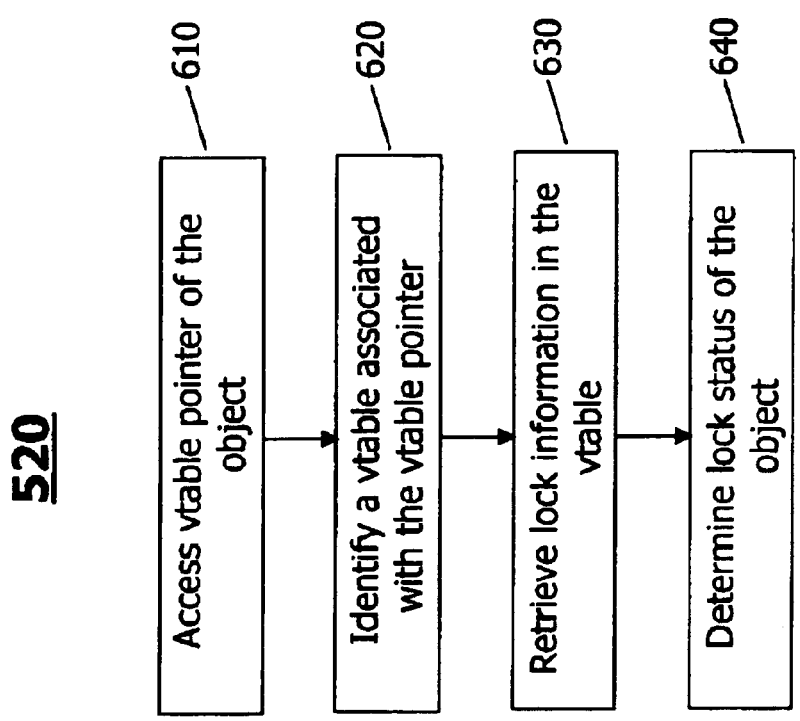
FIG. 6 is a flowchart of an exemplary process, in which the lock status of an object is examined through a vtable, according to embodiments of the present invention.

FIG. 6 is a flowchart of an exemplary process, in which the lock status of an object is examined through a vtable, according to embodiments of the present invention. To examine the lock status of an object, a vtable pointer stored in the object is first accessed at act 610. Through the vtable pointer, a vtable (e.g., either a shared vtable or a cloned vtable) is identified at act 620. From the identified vtable, the lock information stored in the identified vtable is retrieved, at act 630, and the lock status of the corresponding object is determined at act 640.

Figure 7:
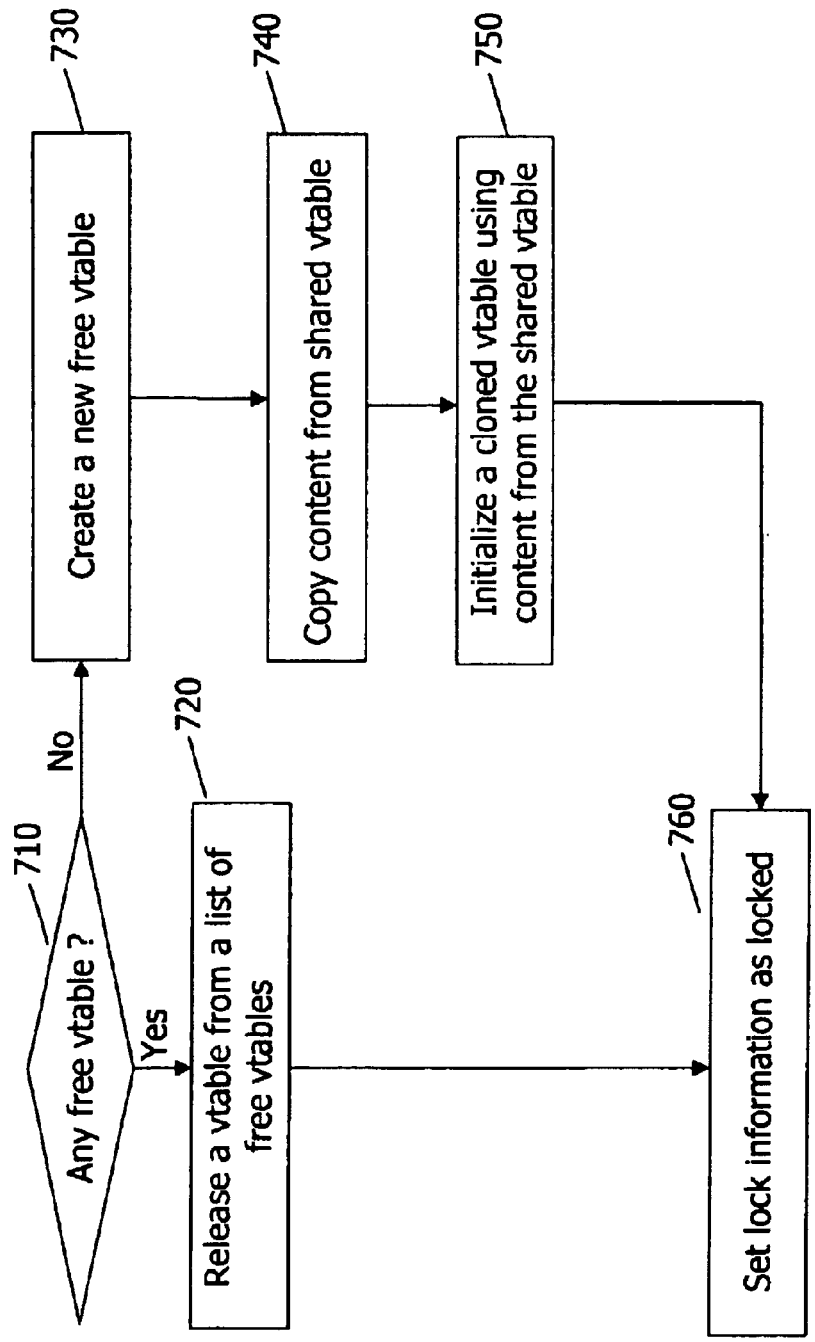
FIG. 7 is a flowchart of an exemplary process, in which a cloned vtable is created and set to lock an object, according to embodiments of the present invention.

FIG. 7 is a flowchart of an exemplary process, in which a cloned vtable is constructed and corresponding lock information is set to lock an object, according to embodiments of the present invention. To create a cloned vtable, it is first determined, at act 710, whether there is any free vtable available for cloning purposes. If a list of free vtables is retained, it is determined whether there is any more free vtables from the list. If there is a free vtable available in such a list, the free vtable is released from the list at act 720 as a cloned vtable. Since this vtable is used previously for cloning purposes and is retained for future use, it may still have the identical content as that in the shared vtable except the lock status. In this case, the released vtable is already ready to be used except the lock information that may need to be reset at act 760. A different implementation may also re-initialize the released vtable.

When there is no more available free vtable in the list of free vtables or there is no associated list of free vtables, a new vtable is allocated or created, at act 730, for cloning. To clone the newly allocated or created vtable based on a corresponding shared vtable, the content of the shared vtable is first copied, at act 740, and then used to initialize, at act 750, the content in the newly created vtable. Then the lock information in the newly created viable is set, at act 760, to indicate that the associated object is locked. At this point, the newly created vtable is cloned.

Figure 8:
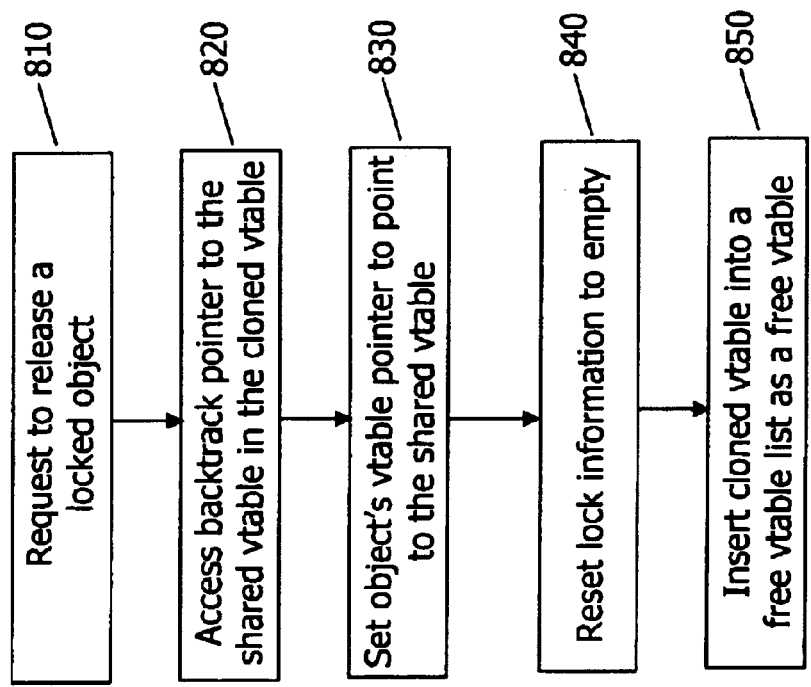
FIG. 8 is a flowchart of an exemplary process, in which a lock represented by a cloned vtable is released, according to embodiments of the present invention.

FIG. 8 is a flowchart of an exemplary process, in which a lock represented by a cloned vtable is released, according to embodiments of the present invention. A process that acquired an object first requests, at act 810, to release a locked object. To release the object, a corresponding cloned vtable associated with the object is to be released and the object is to be linked back to a shared vtable. To determine which shared vtable the released object should be linked to, the backtrack pointer stored in the cloned vtable is accessed at act 820. The vtable pointer of the released object is then set, at act 830, to the value of the backtrack pointer to point to such identified shared vtable.

In the shared vtable, there is lock information associated with non-lock object(s) of a same class. The lock information in the shared vtable is set, at act 840, to indicate that there is no lock on associated objects. Then, the cloned vtable of the object is released and inserted, at act 850, back to a list of free vtables associated with the shared vtable as a free vtable.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. A method, comprising:
   requesting to acquire a shared object;
   examining whether the shared object is locked via a vtable pointer stored in the shared object;
   constructing a cloned vtable by copying a shared vtable to lock the shared object if the lock information of the shared object indicates that the shared object is not yet locked; and
   locking the shared object using the cloned vtable and not setting a lock indicator on the shared vtable to locked.

2. The method according to claim 1, wherein said examining comprises:
   accessing the vtable pointer stored in the shared object;
   identifying a vtable associated with the vtable pointer;
   retrieving the lock information of the shared object from the vtable associated with the vtable pointer; and
   determining lock status of the shared object based on the retrieved lock information.

3. A method, comprising:
   requesting to acquire a shared object;
   examining whether the shared object is locked via a vtable pointer stored in the shared object by
      accessing the vtable pointer stored in the shared object;
      identifying a vtable associated with the vtable pointer;
      retrieving the lock information of the shared object from the vtable associated with the vtable pointer; and
      determining lock status of the shared object based on the retrieved lock information;
   constructing a cloned vtable to lock the shared object based on a shared vtable if the lock information of the shared object indicates that the shared object is not yet locked by identifying a free vtable to generate the cloned vtable; and cloning the free vtable to generate the cloned vtable based on the content from the shared vtable associated with the shared object; and locking the shared object using the cloned vtable.

4. The method according to claim 3, wherein identifying a free vtable comprises:

examining whether the free vtable is available from a list of zero or more free vtables associated with the shared vtable;

releasing a vtable from the list of zero or more free vtables as the free vtable if there is at least one free vtable available; and creating a new vtable as the free vtable if there is no vtable available from the list of zero or more vtables.

5. The method according to claim 4, wherein said locking comprises:

setting the lock information in the cloned vtable to indicate that the shared object is now locked; and updating the vtable pointer of the shared object to point to the cloned vtable.

6. The method according to claim 5, further comprising releasing the lock of the shared object after using the locked shared object through resetting the vtable pointer of the shared object to point to the shared vtable.

7. The method according to claim 6, wherein said releasing further comprising one of:

inserting the cloned vtable into the list of free vtables as a free vtable; or deallocating the cloned vtable.

8. A method to lock a shared object, comprising:

requesting to acquire a shared object; examining whether the shared object is locked via a vtable pointer stored in the shared object;

constructing a cloned vtable to lock the shared object based on a shared vtable; and locking the shared object using the cloned vtable and not setting lock information in the shared vtable to locked.

9. A method to lock a shared object, comprising:

constructing a cloned vtable to lock a shared object based on a shared vtable by identifying a free vtable; and cloning the free vtable to generate the cloned vtable based on the content from the shared vtable associated with the shared object; and locking the shared object using the cloned vtable.

10. The method according to claim 9, wherein said identifying comprises:

examining whether the free vtable is available from a list of zero or more free vtables associated with the shared vtable;

releasing a vtable from the list of zero or more free vtables as the free vtable if there is at least one free vtable available; and creating a new vtable as the free vtable if there is no vtable available from the list of zero or more vtables.

11. The method according to claim 9, wherein said locking comprises:

setting the lock information in the cloned vtable to indicate that the shared object is now locked; and updating the vtable pointer of the shared object to point to the cloned vtable.

12. A method to release the lock of a shared object, comprising:

identifying a pointer stored in a cloned vtable that points to a shared vtable, the cloned vtable being associated with a shared object with lock information indicating that the shared object is locked;

setting a vtable pointer of the shared object to be the pointer pointing to the shared vtable; and deallocating the cloned vtable.

13. A method to release the lock of a shared object, comprising:

identifying a pointer stored in a cloned vtable that points to a shared vtable, the cloned vtable being associated with a shared object with lock information indicating that the shared object is locked;

setting a vtable pointer of the shared object to be the pointer pointing to the shared vtable; and inserting the cloned vtable into the list of free vtables as a free vtable.

14. A system, comprising:

a shared vtable;

one or more cloned vtables that are cloned based on the shared vtable;

one or more shared objects, each of the one or more shared objects having a vtable pointer pointing to either the shared vtable or a cloned vtable, the cloned vtable associated with a shared object indicating that the shared object is locked via lock information in the cloned vtable; and a list of one or more free vtables that are accessible via the shared vtable and can be used to create cloned vtables.

15. A system, comprising:

a shared vtable;

zero or more cloned vtables that are cloned based on the shared vtable;

zero or more shared objects, each having a vtable pointer pointing to either the shared vtable or a cloned vtable, the cloned vtable associated with a shared object indicating that the shared object is locked via lock information in the cloned vtable; and a list of zero or more free vtables that are accessible via the shared vtable and can be used to create cloned vtables.

16. The system according to claim 15, wherein the list of zero or more free vtables are organized as a linked list, with a next free vtable pointer in the shared vtable pointing to the head of the linked list and each of the free vtables in the linked list includes a corresponding next free vtable pointer pointing to either the next free vtable in the linked list or to the end of the linked list.

17. The system according to claim 15, wherein the free vtables in the list of free vtables can be accessed via corresponding free vtable pointers in the shared vtable.

18. An article comprising a computer readable storage medium having stored thereon instructions that, when executed by a machine, result in the following:

requesting to acquire a shared object;

examining whether the shared object is locked via a vtable pointer stored in the shared object;

constructing a cloned vtable by copying a shared vtable to lock the shared object if the lock information of the shared object indicates that the shared object is not yet locked; and locking the shared object using the cloned vtable and not setting a lock indicator in the shared vtable to locked.

19. The article comprising a computer readable storage medium having stored thereon instructions according to claim 18, wherein said examining comprises:

accessing the vtable pointer stored in the shared object;

identifying a vtable associated with the vtable pointer;

retrieving the lock information of the shared object from the vtable associated with the vtable pointer; and determining lock status of the shared object based on the retrieved lock information.

20. An article comprising a computer readable storage medium having stored thereon instructions that, when executed by a machine, result in the following:

requesting to acquire a shared object;

examining whether the shared object is locked via a vtable pointer stored in the shared object by accessing the vtable pointer stored in the shared object;

identifying a vtable associated with the vtable pointer;

retrieving the lock information of the shared object from the vtable associated with the vtable pointer; and determining lock status of the shared object based on the retrieved lock information;

constructing a cloned vtable to lock the shared object based on a shared vtable if the lock information of the shared object indicates that the shared object is not yet locked by identifying a free vtable to generate the cloned vtable; and cloning the free vtable to generate the cloned vtable based on the content from the shared vtable associated with the shared object; and locking the shared object using the cloned vtable.

21. The article a comprising a computer readable storage medium having stored thereon instructions according to claim 20, wherein identifying a free vtable includes:

examining whether the free vtable is available from a list of zero or more free vtables associated with the shared vtable;

releasing a vtable from the list of zero or more free vtables as the free vtable if there is at least one free vtable available; and creating a new vtable as the free vtable if there is no vtable available from the list of zero or more vtables.

22. The article comprising a computer readable storage medium having stored thereon instructions according to claim 21, wherein said locking includes:

setting the lock information in the cloned vtable to indicate that the shared object is now locked; and updating the vtable pointer of the shared object to point to the cloned vtable.

23. The article comprising a computer readable storage medium having stored thereon instructions according to claim 22, the instructions, when executed by a machine, resulting in releasing the lock of the shared object after using the locked shared object through resetting the vtable pointer of the shared object to point to the shared vtable.

24. The article comprising a computer readable storage medium having stored thereon instructions according to claim 23, wherein said releasing further includes one of the group of: inserting the cloned vtable into the list of free vtables as a free vtable; and deallocating the cloned vtable.

25. An article comprising a computer readable storage medium having stored thereon instructions to lock a shared object that, when executed by a machine, result in the following:

requesting to acquire a shared object; examining whether the shared object is locked via a vtable pointer stored in the shared object;

constructing a cloned vtable to lock the shared object based on a shared vtable; and locking the shared object using the cloned vtable and not setting lock information in the shared vtable to locked.

26. An article comprising a computer readable storage medium having stored thereon instructions to lock a shared object that, when executed by a machine, result in the following:

constructing a cloned vtable to lock a shared object based on a shared vtable by identifying a free vtable to generate the cloned vtable; and cloning the free vtable to generate the cloned vtable based on the content from the shared vtable associated with the shared object; and locking the shared object using the cloned vtable.

27. The article comprising a computer readable storage medium having stored thereon instructions according to claim 26, wherein said identifying includes:

examining whether the free vtable is available from a list of zero or more free vtables associated with the shared vtable;

releasing a vtable from the list of zero or more free vtables as the free vtable if there is at least one free vtable available; and creating a new vtable as the free vtable if there is no vtable available from the list of zero or more vtables.

28. The article comprising a computer readable storage medium having stored thereon instructions according to claim 27, wherein said locking includes:

setting the lock information in the cloned vtable to indicate that the shared object is now locked; and updating the vtable pointer of the shared object to point to the cloned vtable.

29. An article comprising a computer readable storage medium having stored thereon instructions to release the lock of a shared object that, when executed by a machine, result in the following:

identifying a pointer stored in a cloned vtable that points to a shared vtable, the cloned vtable being associated with a shared object with lock information indicating that the shared object is locked;

setting a vtable pointer of the shared object to be the pointer pointing to the shared vtable; and deallocating the cloned vtable.

30. An article comprising a computer readable storage medium having stored thereon instructions to release the lock of a shared object that, when executed by a machine, result in the following:

identifying a pointer stored in a cloned vtable that points to a shared vtable, the cloned vtable being associated with a shared object with lock information indicating that the shared object is locked;

setting a vtable pointer of the shared object to be the pointer pointing to the shared vtable; and inserting the cloned vtable into the list of free vtables as a free vtable.

* * * * *